(12) United States Patent
Teschner et al.

(10) Patent No.: US 7,484,490 B2
(45) Date of Patent: Feb. 3, 2009

(54) SWITCHING DRUM SEAL

(75) Inventors: Matthias Teschner, Ludwigsburg (DE);
Arthur Klotz, Remseck (DE); Mathias Endress, Neuenstein (DE)

(73) Assignee: Mann & Hummel GmbH, Ludwigsburg (DE)

( * ) Notice: Subject to any disclaimer, the term of this patent is extended or adjusted under 35 U.S.C. 154(b) by 106 days.

(21) Appl. No.: 11/605,217

(22) Filed: Nov. 29, 2006

(65) Prior Publication Data
US 2007/0277767 A1   Dec. 6, 2007

(30) Foreign Application Priority Data
Nov. 29, 2005   (DE) ................... 20 2005 018 726 U

(51) Int. Cl.
   F02M 35/10   (2006.01)
   F01L 7/00    (2006.01)
(52) U.S. Cl. ............................. 123/184.53; 123/190.17
(58) Field of Classification Search ............ 123/184.53, 123/184.55, 190.17
   See application file for complete search history.

(56) References Cited

U.S. PATENT DOCUMENTS

| 6,138,628 | A | 10/2000 | Alex et al. |
| 6,588,389 | B1 | 7/2003 | Jessberger et al. |

FOREIGN PATENT DOCUMENTS

| DE | 197 12 680 A1 | 10/1998 |
| DE | 199 44 108 A1 | 3/2001 |

*Primary Examiner*—Noah Kamen
(74) *Attorney, Agent, or Firm*—Crowell & Moring LLP

(57) ABSTRACT

A switching drum seal (1) for a switching drum (11) for sealing an intake pipe in an intake manifold system of a multi-cylinder internal combustion engine, having two spaced-apart, circumferentially extending circumferential sealing sections (2) with circumferential sealing surfaces (3) and two spaced-apart, axially extending axial sealing sections (4) with axial sealing surfaces (5) and having at least one resilient element (7) to impart resilience to at least one circumferential sealing section (2) perpendicular to its circumferential sealing surface. The resilient element (7) extends in a region between the switching drum (11) and one of the circumferential sections (2) and is supported on the switching drum (11).

14 Claims, 5 Drawing Sheets

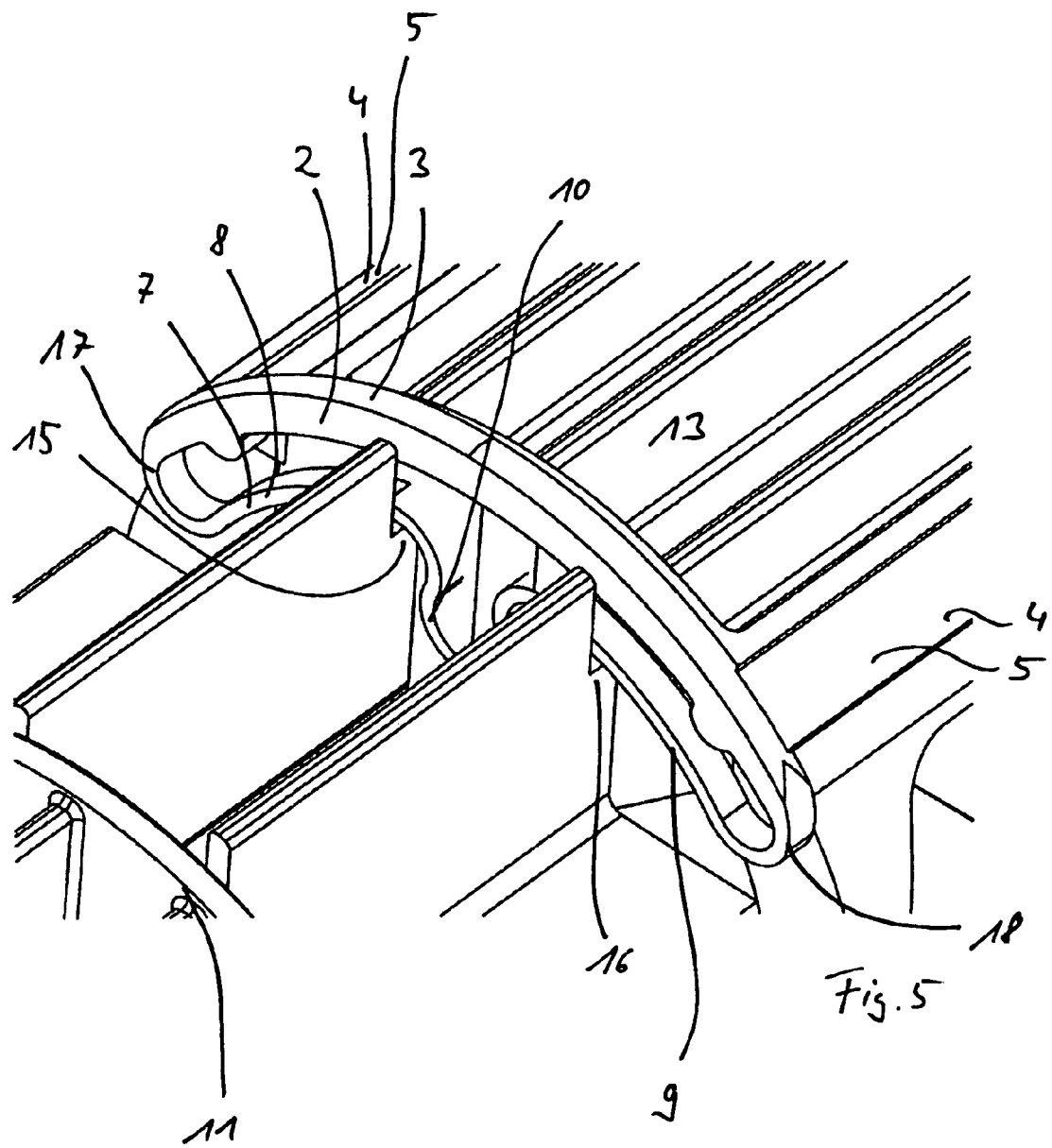

SWITCHING DRUM SEAL

BACKGROUND OF THE INVENTION

The invention relates to a switching drum seal for a switching drum or drum controller for opening and closing an intake pipe in an intake manifold system of a multi-cylinder internal combustion engine.

U.S. Pat. No. 6,138,628 (=DE 197 12 680) discloses a seal for a switching drum for sealing an intake pipe in an intake manifold system of a multi-cylinder internal combustion engine. The switching drum is disposed in a longitudinal bore intersecting at least two intake pipes and has a switching drum seal mounted thereon for each intake pipe. The known switching drum seal has two parallel circumferential sealing sections with circumferential sealing surfaces and two parallel axial sealing sections with axial sealing surfaces. The axial sealing sections connect the two circumferential sealing sections to each other. The sealing surfaces of all the sealing sections are in resilient contact with the inner wall of the switching drum bore in which the switching drum is received and, depending on the position of the switching drum, close off an intake pipe. To ensure sealing contact of the sealing surfaces to the inner wall of the switching drum bore, the circumferential sealing sections are designed to extend beyond the axial sealing sections with a partially-circular leg on both sides, such that in the installed state the switching drum seal completely encircles the switching drum. The two spring-type legs are radially resilient and thus press the sealing surfaces of all the sealing sections against the inner wall of the switching drum bore.

The known switching drum seal has the disadvantage that it is complex to assemble since the spring-type legs of the sealing element must first be spread apart before the switching drum seal can be laterally slipped onto the switching drum. A further drawback is that the switching drum seals get tangled during transport in bulk containers and must be manually separated prior to assembly.

Additional switching drum seals are disclosed in U.S. Pat. No. 6,588,389 (=DE 199 44 108) in which separate sealing elements are used to provide the seal in circumferential direction and the seal in axial direction. The sealing elements extending in circumferential direction are configured as split rings that enclose the switching drum along the periphery. A disadvantage of these switching drum seals is the increased assembly complexity because of the multipart design. Assembly is made more difficult because the sealing elements extending in circumferential direction have to be spread apart before they can be slipped onto the switching drum.

SUMMARY OF THE INVENTION

It is therefore an object of the invention to provide an improved switching drum seal.

Another object of the invention is to provide a switching drum seal that has good sealing characteristics and at the same time is easy to mount on a switching drum.

These and other objects are achieved in accordance with the present invention by providing a switching drum seal for a switching drum for opening or closing an intake pipe in an intake manifold system of a multi-cylinder internal combustion engine, said switching drum comprising two spaced-apart, circumferentially extending circumferential sealing sections with circumferential sealing surfaces and two spaced-apart, axially extending axial sealing sections with axial sealing surfaces, and at least one resilient element disposed on a side of a circumferential sealing section facing the switching drum for imparting resilience to the respective circumferential sealing section in a radial direction.

Advantageous preferred embodiments of the invention are also described hereinafter.

The invention is based on the idea of arranging resilient element in an area underneath the circumferential sealing section to ensure contact pressure of the circumferential sealing surfaces against the inner wall of the switching drum bore. In other words, the resilient element is disposed on the side of a circumferential sealing section facing the switching drum, which means that it extends into the area between the switching drum and one of the circumferential sealing sections. Thus, the resilient element is supported on the switching drum. Depending on the design of the resilient element, there is no direct contact between the circumferential sealing section and the switching drum. Since the resilient element is disposed in an area located radially between the switching drum and the circumferential sealing section, the cage-like configuration of the switching drum seal with resilient legs that completely enclose the switching drum can be dispensed with. This also advantageously eliminates the assembly step of spreading apart the resilient annular legs. Furthermore, with the arrangement of resilient element according to the invention, the switching drum seal can be made substantially more compact, so that the packing density, particularly in bulk containers, is increased, which in turn has positive effects on the shipping costs. The resilient elements are advantageously provided below the two spaced-apart circumferential sealing sections to ensure that all the sealing surfaces are uniformly pressed against the inner wall of the camshaft bore. One embodiment of the invention advantageously provides that the resilient element comprises at least one resilient web. This resilient web extends, according to the invention, into the area between the circumferential sealing section and the switching drum. To ensure uniform contact pressure of the circumferential sealing surfaces against the inner wall of the switching drum bore, it is possible to provide two resilient webs each having a free end.

Advantageously one or more webs may be provided which extend at least partially parallel and spaced apart from the associated circular segment-shaped circumferential sealing surface. The web thus extends parallel to the switching drum circumference and the circumferential sealing surface so as to minimize the overall height of the switching drum seal.

In another particularly advantageous refinement of the invention, the web together with the associated circumferential sealing section forms a closed contour line. This means that the resilient element is continuous and uninterrupted and advantageously connects two circumferentially spaced-apart ends of the circumferential sealing section with each other. The web and the circumferential sealing section enclose an open clearance, into which the web can deflect radially inwardly. The closed contour line formed by the circumferential sealing section with the web-shaped resilient element has the advantage that the seals cannot become entangled during transport in a bulk container because they have no free ends. This makes it possible to eliminate the previously required work step of manually separating the switching drum seals.

It is desirable to limit the contact pressure in radial direction of the circumferential sealing surfaces on the inner wall to the maximum required degree so as to minimize the occurrence of wear and friction along the inner wall of the switching drum bore and/or the circumferential sealing surfaces. For this purpose, the resilience of the resilient element must be limited to an optimal level in radial direction. One way to accomplish this is to minimize the wall thickness of the web at least in part in the radial direction. To ensure wear resistance, the material normally used to manufacture the switching drum seal is polyamide 6-6 with a 15% glass fiber content. It would thus be difficult to reduce the wall thickness to less than approximately 0.8 mm because a thinner resilient web would have insufficient stability. One embodiment of the invention therefore provides that the web has two spaced-apart, radially resilient sections and that these radially resilient sections are connected with each other by a connecting section in such a way that the contour line of the connecting section diverges from the contour line of the radially resilient sections. Advantageously the radially resilient sections extend at least in part approximately parallel to the associated annular circumferential sealing surfaces. The contour line of the connecting section diverges from this part-circular contour line. This break in the contour line of the web reduces the resilience in radial direction as compared to a uniform, particularly an arc-shaped, continuous web.

It has been found that an optimal resilience may be achieved with a meander or a horseshoe-shaped connecting section. In this case the contour line of the connecting section encloses a circular segment, the wrap angle of which is preferably greater than 180°.

Advantageously, the enclosing angle of the web around the switching drum is less than 180°. As a result the spreading step can be eliminated in the mounting of the switching drum seal.

To secure the switching drum seal to the switching drum, particularly in a releasable manner, a positive locking connection between the switching drum seal and the switching drum is advantageously provided. Preferably, the switching drum seal has latching member that cooperates with a corresponding complementarily-shaped latching element on the switching drum.

It is useful to dispose the latching member on at least one axial sealing section. Advantageously, latching members are provided on both axial sealing sections, which preferably extend in parallel. With the latching means the switching drum seal can be snapped onto the switching drum.

In another refinement of the invention the latching members are provided in the form of an axially extending latching seat, into which a latching projection on the switching drum can engage. Preferably, the latching member of the switching drum seal forms an undercut with a latching projection of the switching drum.

The invention also relates to a switching drum disposed in a switching drum bore of an intake manifold system, which comprises at least one switching drum seal according to the invention.

Advantageously, for each spring-like element the switching drum has two webs spaced apart circumferentially and extending radially, on which the spring-like element is supported.

The switching drum seal is preferably secured to the switching drum with latching member. In particular, the switching drum has a latching projection that interlocks with a latching seat formed in the switching drum seal. Of course, the latching projection and the latching seat can also be interchanged.

BRIEF DESCRIPTION OF THE DRAWINGS

The invention will be described in further detail hereinafter with reference to illustrative preferred embodiments shown in the accompanying drawing figures, in which:

FIG. 5 is a detail view of a switching drum seal mounted on a switching drum.

DETAILED DESCRIPTION OF PREFERED EMBODIMENTS

Figure 1:
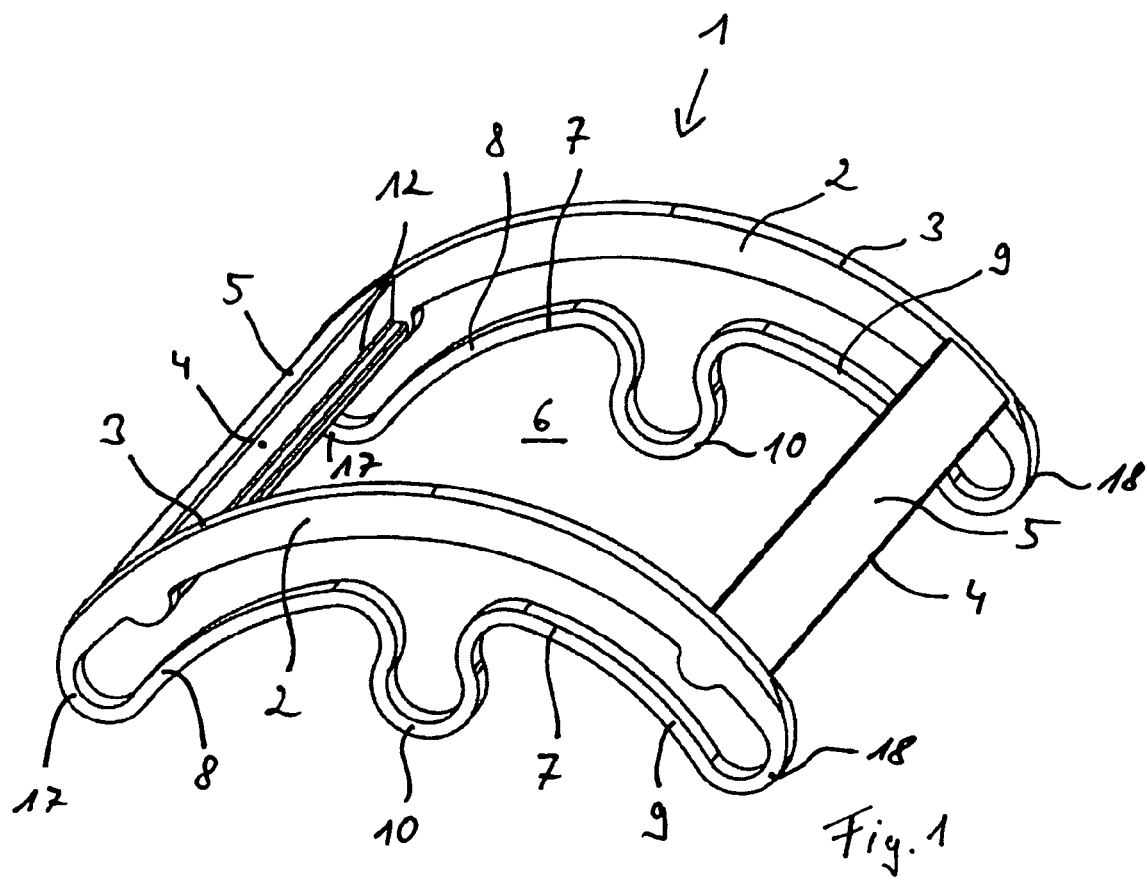
FIG. 1 is a perspective view of a switching drum seal according to the invention.

In the figures, like components and components with the same function are identified by the same reference numerals.

FIG. 1 illustrates a switching drum seal 1. The switching drum seal 1 comprises two spaced-apart circumferential sealing sections 2 with part-circular circumferential sealing surfaces 3. In addition to the parallel and convexly shaped circumferential sealing sections 2, the switching drum seal 1 has two parallel, straight, axially extending sealing sections 4 with external axial sealing surfaces 5.

The two circumferential sealing surfaces 3, together with the two axial sealing surfaces 5, enclose a region 6 in the form of a curved rectangle. In sealing position the region 6 is brought into registration with an opening of an intake pipe. The circumferential sealing surfaces 3 and the axial sealing surfaces 5 then seal off the intake pipe opening relative to the switching drum by contacting the inner wall of the switching drum bore.

The circumferential sealing sections 2 protrude slightly in circumferential direction beyond the axial section 4 on two opposite sides. At these end regions, the circumferential sections 2 are bent inward and lead into radially resilient webs 7. Each circumferential sealing section 2 has an associated radially resilient web 7. The radially resilient webs 7 are spaced apart from the circumferential sealing sections 2 and are located underneath the sealing sections. The webs 7 together with the circumferential sections 2 form a closed contour line, which prevents them from getting entangled in a bulk container. The webs 7 have no free ends.

Each web 7 is divided into two outer radially resilient sections 8, 9 and a connecting section 10 disposed precisely in the center between the two radially resilient sections. The entire switching drum seal is integrally formed of the same material. The two radially resilient sections 8, 9 extend substantially parallel to the circumferential sealing surfaces 3, i.e., they are circular segment shaped and concavely formed. The connecting sections 10 extend away from the circumferential sealing sections 2 toward the switching drum 11.

Due to the web-shaped resilient element 7, both the circumferential sealing sections 2 and the axial sealing sections 4 are resilient in radial direction, i.e., perpendicular to the sealing surfaces, and are pressed against the inner wall of the switching drum bore.

To mount the switching drum seal 11 to a switching drum, two parallel latching recesses 12 in the form of grooves are integrated into the axial sealing sections 4. The lower groove walls as seen in the drawing plane engage around elongated latching projections 19 (see FIG. 3) on the switching drum.

Figure 2:
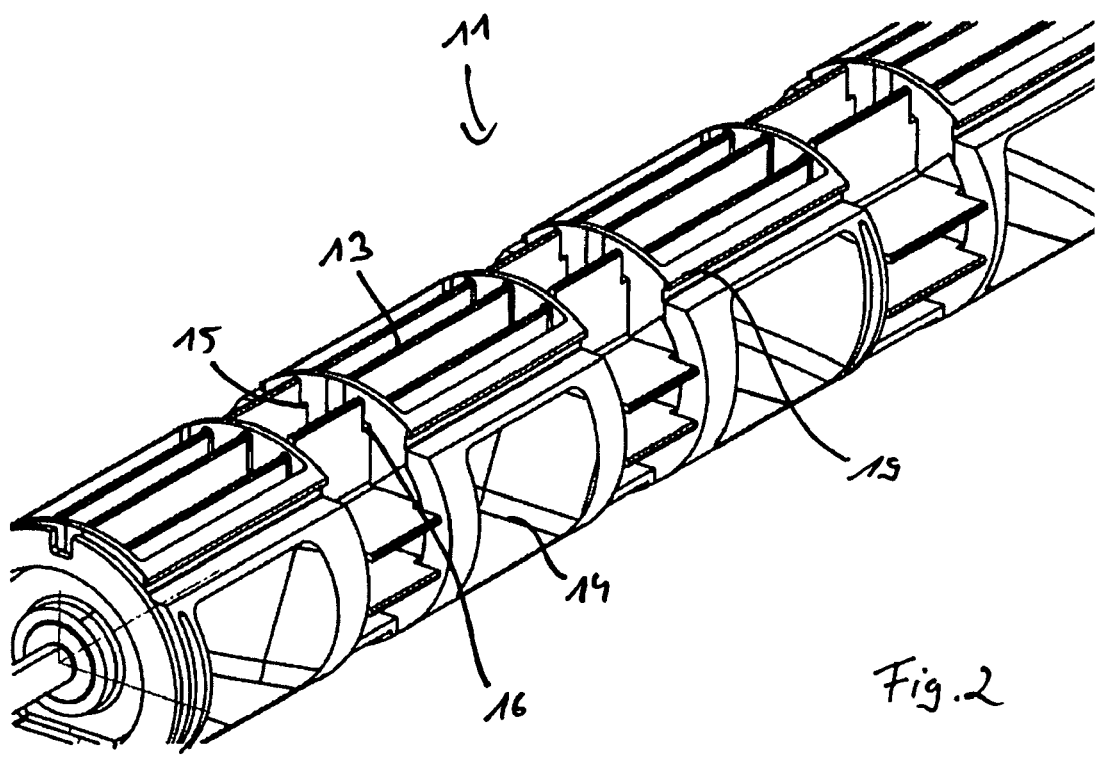
FIG. 2 is a perspective view of a switching drum without switching drum seals.
Figure 3:
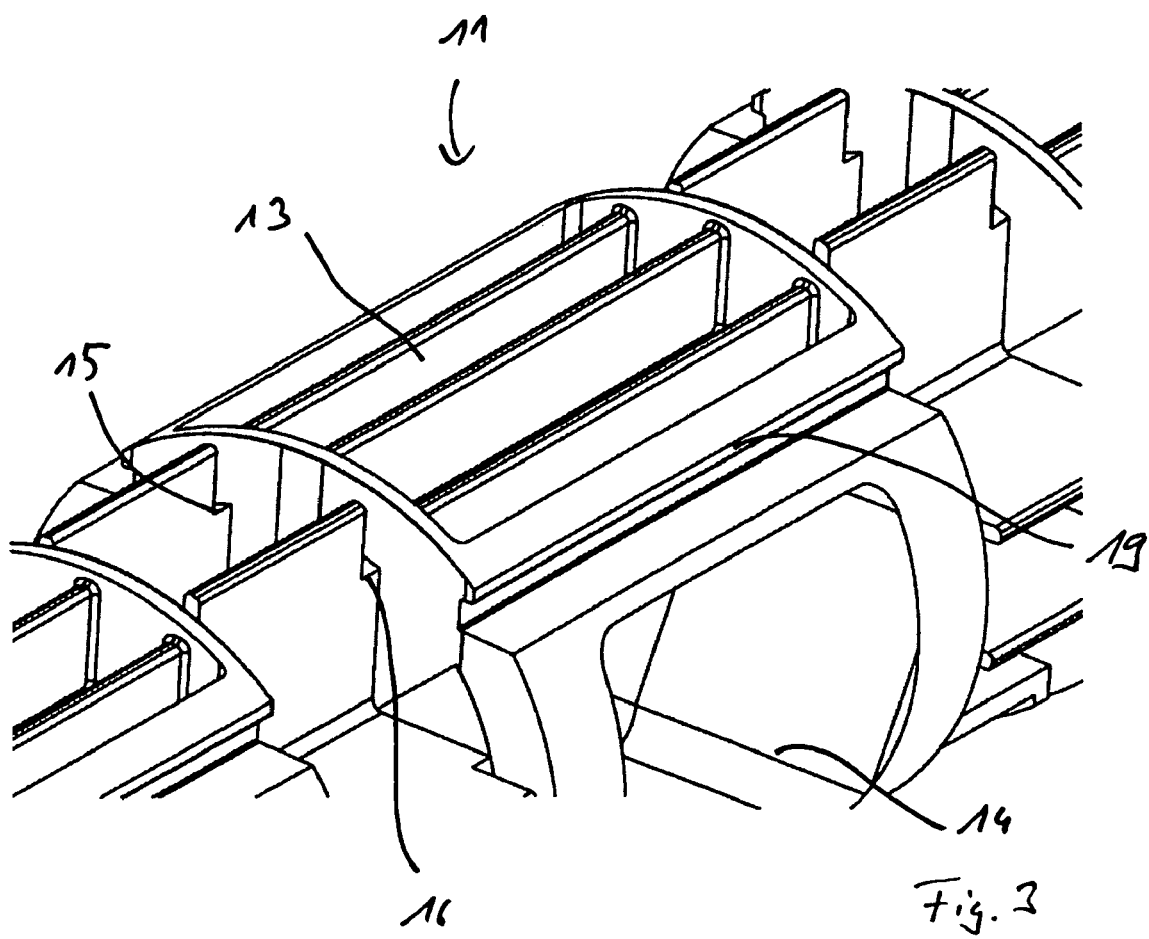
FIG. 3 is an enlarged detail view of FIG. 2.

FIGS. 2 and 3 show details of a switching drum 11 without a switching drum seal. The switching drum has spaced-apart passageways 14 through which the two intake pipes leading into the switching drum bore can be connected with each other. Closed regions 13 or sealing areas are provided, which are spaced apart from the passageways 14 in circumferential direction. These are enclosed by the switching drum seals and are brought into registration with an intake pipe for sealing.

Figure 4:
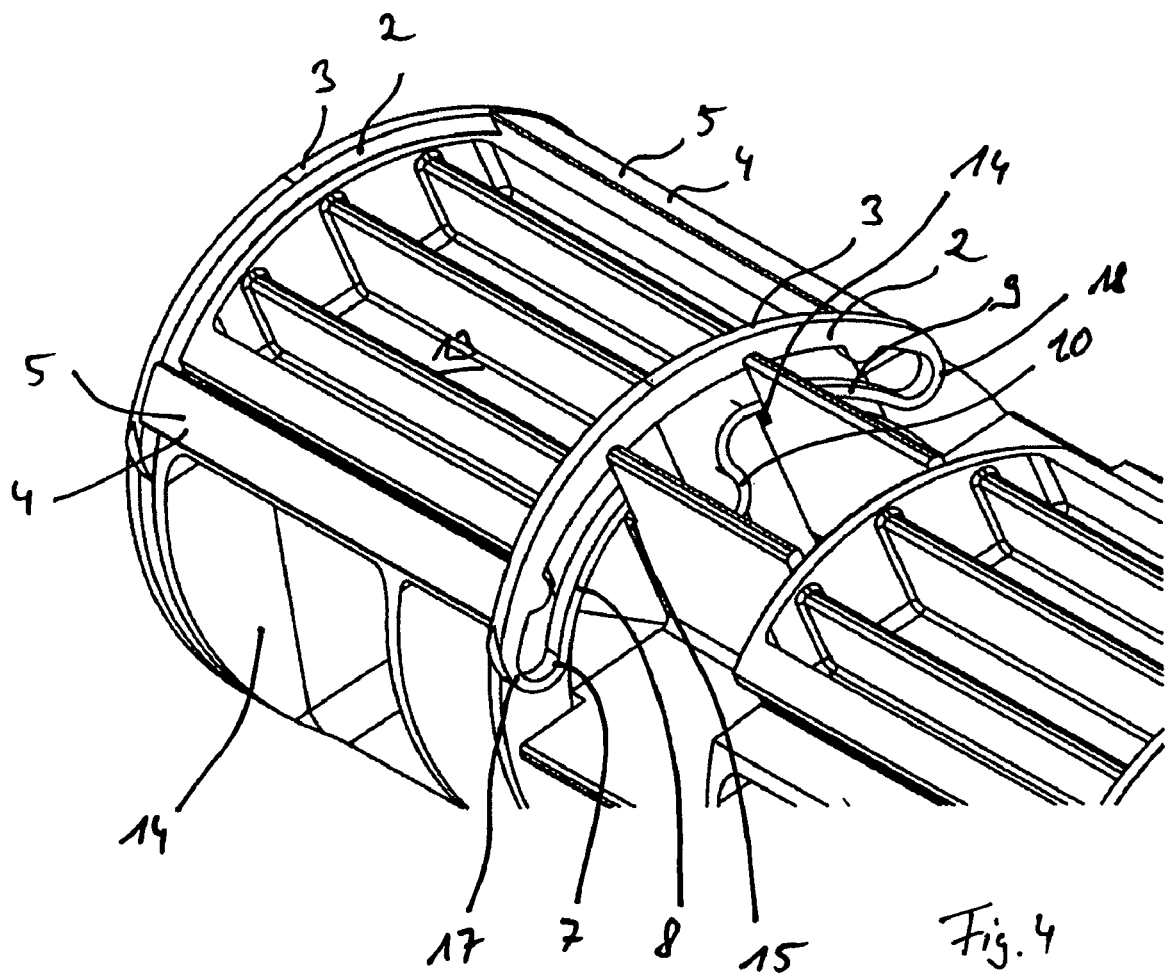
FIG. 4 is a detail view of a switching drum with a mounted switching drum seal.

FIGS. 4 and 5 show a switching drum 11 with a switching drum seal 1 mounted thereon. The switching drum 11 extends within a switching drum bore of an intake manifold system, not shown here. For a description of the arrangement of the switching drum within an intake manifold system see U.S. Pat. Nos. 6,138,628 and 6,588,389, the disclosures of which are incorporated herein by reference. With the aid of the two parallel, axially extending latching recesses 12 formed in the axial sealing sections 4, the switching drum seal 1 is snapped onto the likewise axially extending latching projections 19 of the switching drum 11 shown in FIGS. 2 and 3.

On the switching drum side, the region 6 is closed between the circumferential sealing sections 2 and the axial sealing sections 4 (reference numeral 13). The closed region 13 protrudes radially above the lower circumferential edge of the circumferential sealing sections 2 and the axial sealing sections 4. By twisting the switching drum 11 within the switching drum bore, the enclosed region 13 can be rotated over the opening of an intake pipe. The cooperation of the closed region 13 and the circumferential sealing surfaces 3 as well as the axial sealing surfaces 5 of the switching drum seal 1 causes the air stream from or to the intake pipe to be interrupted.

Two intake pipes opening into the switching drum bore can be connected to each other through one of the continuous passageways 14 of the switching drum 11.

FIGS. 4 and 5 illustrate the flexible web 7 with its two radially resilient, concavely formed sections 8, 9 and the connecting section 10 joining them in the center. The connecting section 10 extends in the direction of the switching drum 11, i.e., it is curved in opposite direction to that of the resilient sections 8, 9. It can be seen that the radially resilient sections 8, 9 are each supported on a radial web 15, 16 of the switching drum 11 in radial direction. The circumferential section 2 is connected to the web 7 through circumferentially spaced curved sections 17, 18. An important aspect is that the web 7 is supported on the one hand on the circumferential sealing section 2 and/or the axial sealing section 4 and on the other hand on the switching drum 11 or the radial webs 15, 16 of the switching drum 11.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A switching drum seal for a switching drum for opening or closing an intake pipe in an intake manifold system of a multi-cylinder internal combustion engine, said switching drum comprising two spaced-apart, circumferentially extending circumferential sealing sections with circumferential sealing surfaces and two spaced-apart, axially extending axial sealing sections with axial sealing surfaces, and at least one resilient element disposed on a side of a circumferential sealing section facing the switching drum for imparting resilience to the respective circumferential sealing section in a radial direction, said resilient element comprising at least one flexible web which forms a closed contour line together with a circumferential sealing section, and said web comprising two radially resilient sections that are connected with each other via a connecting section, wherein the contour line of the connecting section diverges from the contour line of the radially resilient sections.

2. A switching drum seal according to claim 1, wherein the flexible web extends at least in part at least approximately parallel to and spaced from the circumferential sealing surface.

3. A switching drum seal according to claim 1, wherein the connecting section is meander-shaped.

4. A switching drum seal according to claim 3, wherein the connecting section is disposed centrally between the radially resilient sections.

5. A switching drum seal according to claim 1, wherein the switching drum seal comprises a latching member for releasably securing the switching drum seal to the switching drum.

6. A switching drum seal according to claim 5, wherein the latching member is disposed on at least an axial sealing section.

7. A switching drum seal according to claim 5, wherein the latching member comprises at least one axially extending latching seat for receiving a latching projection on the switching drum.

8. A switching drum seal for a switching drum for opening or closing an intake pipe in an intake manifold system of a multi-cylinder internal combustion engine, said switching drum comprising two spaced apart, circumferentially extending circumferential sealing sections with circumferential sealing surfaces and two spaced-apart, axially extending axial sealing sections with axial sealing surfaces, and at least one resilient element disposed on a side of a circumferential sealing section facing the switching drum for imparting resilience to the respective circumferential sealing section in a radial direction, wherein the switching drum seal has a wrap angle around the switching drum of less than 180°.

9. A switching drum seal according to claim 8, wherein the resilient element has a wrap angle around the switching drum of less than 180°.

10. A switching drum seal according to claim 8, wherein the switching drum seal comprises a latching member for releasably securing the switching drum seal to the switching drum.

11. A switching drum seal according to claim 10, wherein the latching member is disposed on at least an axial sealing section.

12. A switching drum seal according to claim 10, wherein the latching member comprises at least one axially extending latching seat for receiving a latching projection on the switching drum.

13. A switching drum and seal combination comprising a switching drum for opening or closing an intake pipe in an intake manifold system of a multi-cylinder internal combustion engine and at least one switching drum seal installed on said switching drum, said switching drum comprising two spaced-apart, circumferentially extending circumferential sealing sections with circumferential sealing surfaces and two spaced-apart, axially extending axial sealing sections with axial sealing surfaces, and at least one resilient element disposed on a side of a circumferential sealing section facing the switching drum for imparting resilience to the respective circumferential sealing section in a radial direction, wherein the resilient element is supported on two spaced-apart webs of the switching drum.

14. A switching drum and seal combination according to claim 13, wherein the switching drum has at least one latching projection for latchingly engaging a latching seat on the switching drum seal.

* * * * *